`US008844991B2`

(12) United States Patent
Myers

(10) Patent No.: US 8,844,991 B2
(45) Date of Patent: Sep. 30, 2014

(54) DEVICE FOR SECURING AND CARRYING A COOLER AND FOR OPTIONALLY REPAIRING A LID OF THE COOLER

(71) Applicant: Patrick L. Myers, New Caney, TX (US)

(72) Inventor: Patrick L. Myers, New Caney, TX (US)

( * ) Notice: Subject to any disclaimer, the term of this patent is extended or adjusted under 35 U.S.C. 154(b) by 0 days.

(21) Appl. No.: 13/795,606

(22) Filed: Mar. 12, 2013

(65) Prior Publication Data

US 2014/0166708 A1    Jun. 19, 2014

Related U.S. Application Data

(60) Provisional application No. 61/739,288, filed on Dec. 19, 2012.

(51) Int. Cl.
*B65G 7/12* (2006.01)
*A45F 5/10* (2006.01)

(52) U.S. Cl.
CPC .... *B65G 7/12* (2013.01); *A45F 5/10* (2013.01)
USPC ............ 294/157; 294/150; 294/152; 294/165

(58) Field of Classification Search
CPC ....... A45F 3/14; A45F 5/10; A45F 2003/142; A45F 2005/006; A45F 2005/1013; B65D 63/18; B65G 7/12; A45C 13/30
USPC ......... 294/149, 150, 152, 153, 155, 157, 165, 294/119.2, 68.3; 224/250; 220/592.2
See application file for complete search history.

(56) References Cited

U.S. PATENT DOCUMENTS

| | | | |
|---|---|---|---|
| 413,483 A | 10/1889 | Bays | |
| 618,333 A * | 1/1899 | Colteryahn | 294/157 |
| 841,620 A | 1/1907 | Buchanan | |
| 941,969 A | 11/1909 | Williams | |
| 3,923,222 A * | 12/1975 | Groves | 294/157 |
| 4,261,448 A | 4/1981 | Myers | |
| 4,431,226 A * | 2/1984 | Weilert | 294/150 |
| 4,489,815 A * | 12/1984 | Martinez et al. | 190/1 |
| 4,700,818 A | 10/1987 | Orwin | |
| 4,881,684 A * | 11/1989 | Chinman | 190/115 |
| 5,169,164 A | 12/1992 | Bradford | |
| 5,503,448 A * | 4/1996 | Dewey | 294/152 |
| 6,193,293 B1 * | 2/2001 | Ybanez | 294/152 |
| 6,953,214 B2 * | 10/2005 | Paz | 294/157 |
| 8,123,236 B1 | 2/2012 | Helenihi | |
| 2003/0136808 A1 * | 7/2003 | Kelson | 224/602 |
| 2008/0042460 A1 * | 2/2008 | Fuchs | 294/150 |
| 2009/0200347 A1 | 8/2009 | Edralin | |

* cited by examiner

*Primary Examiner* — Dean Kramer

(57) ABSTRACT

A device includes first straps configured to be secured around a container in a first direction, second straps configured to be secured around the container in a second direction, and third straps configured to be placed partially around the container in a third direction. The device also includes first handles coupled to the third straps, where the first handles are configured to be raised above the container during lifting of the container. The device further includes second handles coupled to one of the first straps, where the second handles are configured to remain secured to the first straps during lifting of the container. The device may also include multiple grommets configured to receive multiple connectors for securing the second straps to a body of the container and to a lid of the container. Lengths of at least the first and second straps may be adjustable.

20 Claims, 4 Drawing Sheets

DEVICE FOR SECURING AND CARRYING A COOLER AND FOR OPTIONALLY REPAIRING A LID OF THE COOLER

CROSS-REFERENCE TO RELATED APPLICATION AND PRIORITY CLAIM

This application claims priority under 35 U.S.C. §119(e) to U.S. Provisional Patent Application No. 61/739,288 filed on Dec. 19, 2012. This provisional patent application is hereby incorporated by reference in its entirety.

TECHNICAL FIELD

This disclosure relates generally to coolers. More specifically, this disclosure relates to a device for securing and carrying a cooler and for optionally repairing a lid of the cooler.

BACKGROUND

Coolers are insulated containers used in a wide variety of circumstances by a wide variety of people. Coolers are typically used to keep food, drinks, and other items cool during transport. There are numerous varieties of coolers manufactured today, including coolers of different shapes and sizes.

SUMMARY

This disclosure provides a device for securing and carrying a cooler and for optionally repairing a lid of the cooler.

In a first embodiment, a device includes first straps configured to be secured around a container in a first direction, second straps configured to be secured around the container in a second direction, and third straps configured to be placed partially around the container in a third direction. The device also includes first handles coupled to the third straps, where the first handles are configured to be raised above the container during lifting of the container. The device further includes second handles coupled to one of the first straps, where the second handles are configured to remain secured to the first straps during lifting of the container.

In a second embodiment, a system includes a container having a body and a lid. The system also includes a device having first straps configured to be secured around the container in a first direction, second straps configured to be secured around the container in a second direction, and third straps configured to be placed partially around the container in a third direction. The device also includes first handles coupled to the third straps, where the first handles are configured to be raised above the container during lifting of the container. The device further includes second handles coupled to one of the first straps, where the second handles are configured to remain secured to the first straps during lifting of the container.

In a third embodiment, a method includes placing a device around a container having a body and a lid and transporting the container using the device. The device includes first straps configured to be secured around the container in a first direction, second straps configured to be secured around the container in a second direction, and third straps configured to be placed partially around the container in a third direction. The device also includes first handles coupled to the third straps, where the first handles are configured to be raised above the container during lifting of the container. The device further includes second handles coupled to one of the first straps, where the second handles are configured to remain secured to the first straps during lifting of the container.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIGS. 1 through 4 illustrate an example device 100 for securing and carrying a cooler according to this disclosure. The cooler here is shown in dashed outline form and includes a body 102 and a lid 104. The cooler includes any suitable insulated container configured to carry one or more items. The cooler could be formed from any suitable material(s), such as plastic. The cooler could also have any suitable size, shape, and dimensions. The lid 104 may be secured to the body 102 using one or more latches, hinges, or other structures (not shown here), or the lid 104 could be completely removable from the body 102.

Common coolers typically lack handles that can sustain prolonged stresses from maximum loads in the coolers. As a result, the handles tend to break over time. Moreover, the lifting point of a common cooler is often not the most ergonomical for lifting or carrying the cooler to a sufficient height. The device 100 represents a strapping device configured to aid in the lifting and carrying of coolers. The device 100 is also configured to ergonomically allow leveraged lifting and carrying of coolers at multiple heights.

Figure 1:
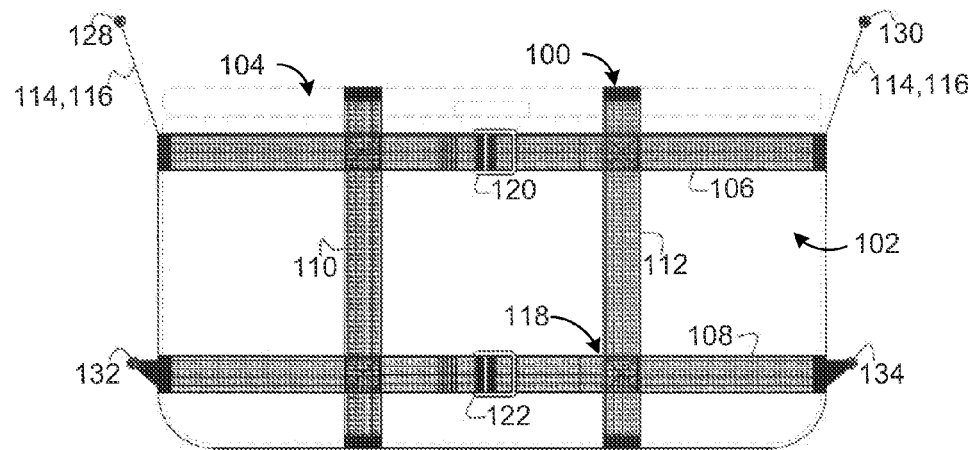
FIGS. 1 through 4 illustrate an example device for securing and carrying a cooler according to this disclosure.
Figure 2:
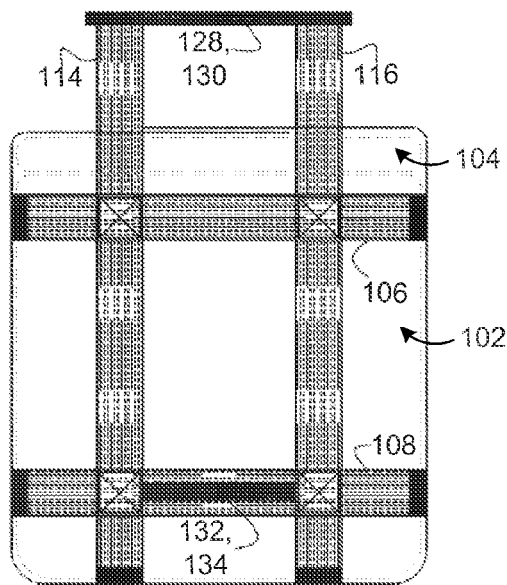
Figure 3:
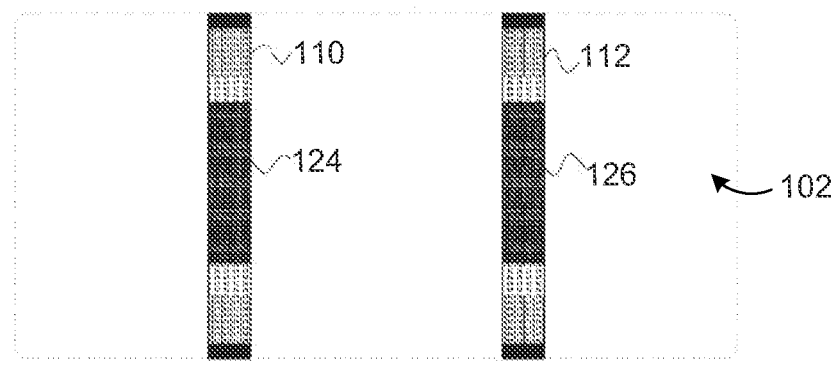
Figure 4:
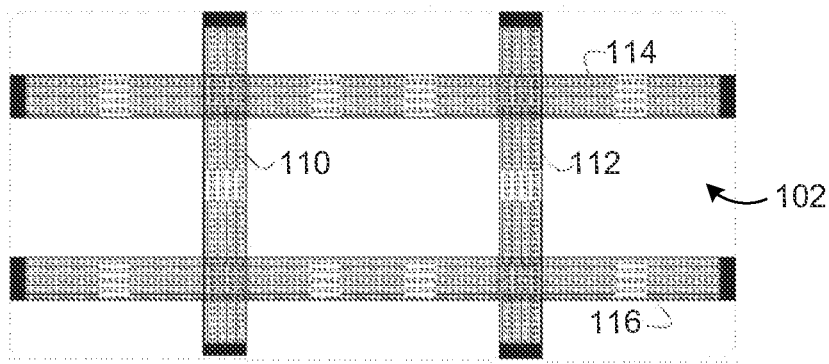
Figure 5:
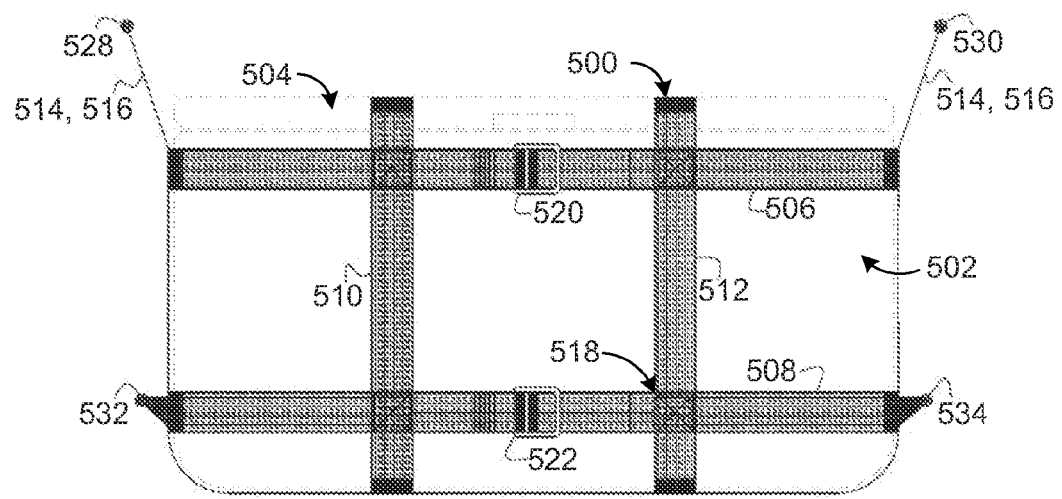
FIGS. 5 through 8 illustrate an example device for securing and carrying a cooler and repairing a lid of the cooler according to this disclosure.

FIG. 1 shows a front plain view of the device 100, FIG. 2 shows a side plain view of the device 100, FIG. 3 shows a top plain view of the device 100, and FIG. 4 shows a bottom plain view of the device 100. The device 100 is formed using an adjustable strapping system that encases the cooler at strategic locations. In this way, the cooler can be fully supported when lifted. As shown in these figures, the device 100 includes two straps 106-108 extending horizontally around the cooler. The device 100 also includes two straps 110-112 extending around the cooler from the top, down the back, under the bottom, and up the front of the cooler. Two additional straps 114-116 extend partially around the cooler from one side under the bottom to the other side (but not over the top) of the cooler.

Each of the straps 106-116 could be formed from any suitable material(s), such as a webbing having a suitable width and overall strength to carry the cooler and its contents during transport. Each strap 106-116 could also represent a single integrated strap or multiple straps arranged in series (and the multiple straps may or may not be connected to one another). In addition, multiple straps could be formed from the same piece of material. For example, the straps 114-116 could be a continuous piece of webbing that threads through upper handles (described below) or two or more individual pieces of webbing that are connected to the upper handles.

The straps 106-108 are connected to the straps 110-112 and to the straps 114-116 at various connection points 118. Any suitable mechanism can be used to connect two straps at a connection point 118. For example, two straps can be sewn together at a connection point 118, or hook-and-loop fasteners could be used at a connection point 118. Any suitable technique or combination of techniques for temporarily or permanently attaching straps can be used at the connection points 118 of the device 100.

The straps 106-108 are equipped with adjustment binders 120-122. The adjustment binders 120-122 can be used to control the lengths of the straps 106-108. For example, one end of the strap 106 could be fixed to the adjustment binder 120. The other end of the strap 106 could be fed through the adjustment binder 120 and held in place through friction, teeth, or other mechanism. This helps to prevent the strap 106 from slipping through the adjustment binder 120. A similar arrangement can occur with the strap 108 and the adjustment binder 122.

Each strap 110-112 is configured so that its ends overlap one another (such as on top or on bottom of the cooler) and are secured to one another via a fastener 124-126, respectively. The fasteners 124-126 can be of sufficient strength so that the straps 110-112 remain secure when the cooler is raised using the device 100. Any suitable fasteners 124-126 can be used to secure ends of a strap together, such as a binder, buckle, or hook-and-loop system. Note that other mechanisms could be used to provide fastening and adjustment capabilities to any of these straps 106-112. Also note that while not shown, various mechanisms could be used to provide the straps 114-116 with an adjustable length.

In this way, the device 100 can be modified so that it fits a particular cooler. This allows the device 100 to be used with a wide variety of coolers having different shapes, sizes, and configurations. Of course, if the device 100 is customized for a particular cooler, adjustment capabilities may be omitted from the straps 106-116.

The device 100 also includes two handle assemblies along opposite sides of the device 100. Namely, the device 100 includes upper handles 128-130 and lower handles 132-134. Each upper handle 128-130 is connected to the straps 114-116 and can extend along all or a substantial portion of the depth of the cooler. Each lower handle 132-134 is positioned along the lower horizontal strap 108. In some embodiments, each lower handle 132-134 could extend between the connection points 118 where the strap 108 connects to the straps 114-116, although the lower handles 132-134 could have a different size.

Each handle 128-134 could be formed from any suitable material(s) and in any suitable manner. Each handle 128-134 could, for example, be formed using a material having the strength to sustain the load of the cooler and its contents, and padding can be added to the handle for comfort. Example types of padding could include foam, leather, or rubber.

In this example, the two sets of handles 128-130 and 132-134 represent different types of handles. In particular, the handles 128-130 are connected to the flexible straps 114-116, which allows those handles 128-130 to be raised above the cooler when the cooler is being lifted or carried. In contrast, the handles 132-134 are fixed along the strap 108, meaning those handles 132-134 remain along the strap 108 when the cooler is being lifted or carried. These handles are provided in addition to handles that may already be present on the cooler, which could be located above the strap 106 (although the cooler could also lack any handles itself).

In this manner, the different handles 128-134 can be strategically fastened to or otherwise located on the device 100 to provide a user with a more ergonomically and leveraged way of lifting and carrying the cooler. Moreover, adding additional lifting points at different heights provides multiple leveraging positions for lifting the cooler.

In addition, the device 100 can secure the straps 110-112 over the lid 104 of the cooler during transport or at other times. This helps to keep the lid 104 secure instead of or in addition to using latches on the cooler. This can be beneficial in various circumstances, such as when one or more hinges or latches of the cooler break.

The latches, hinges, and handles on common coolers tend to fail with continued use and exposure to the elements. The device 100 therefore offers additional security, helping to prevent the lid 104 from flying off the cooler body 102 or popping open during transport of the cooler in the back of a vehicle. This also provides an alternative way to restore use of a cooler that has broken hinges, latches, and handles. Instead of requiring an owner to try and locate and purchase replacement parts that match a particular cooler, the device 100 can be used to secure the lid 104 of the body 102 while providing various handles for lifting the cooler. As a result, use of the cooler can continue without requiring purchase and replacement of hinges, latches, and handles.

FIGS. 5 through 8 illustrate an example device 500 for securing and carrying a cooler and repairing a lid of the cooler according to this disclosure. The device 500 can be used with a cooler having a body 502 and a lid 504. The device 500 shown in FIGS. 5 through 8 can share many common features as the device 100 shown in FIGS. 1 through 4. As a result, components 506-534 shown in FIGS. 5 through 8 may be the same as or similar to corresponding components 106-134 shown in FIGS. 1 through 4 and described above.

Figure 6:
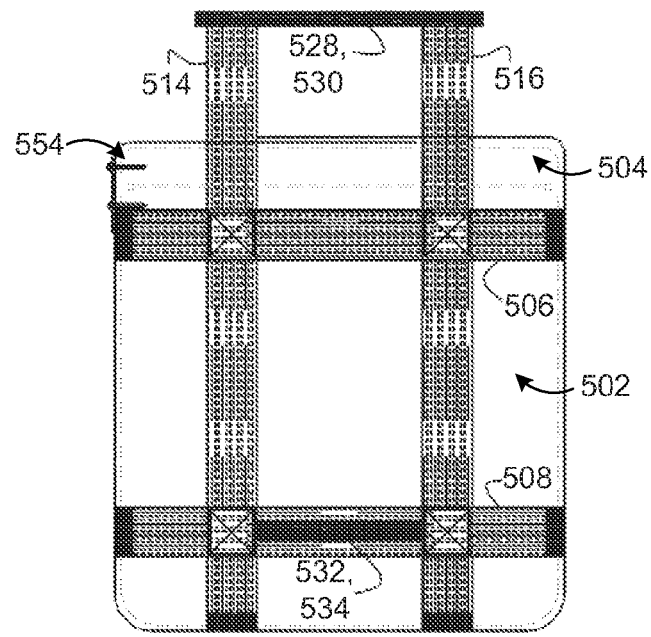
Figure 7:
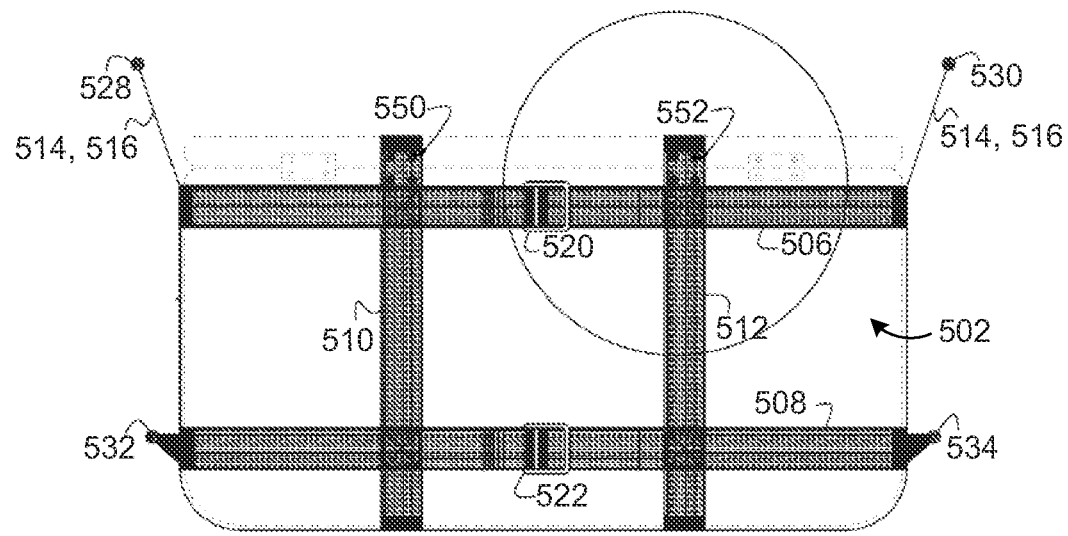
Figure 8:
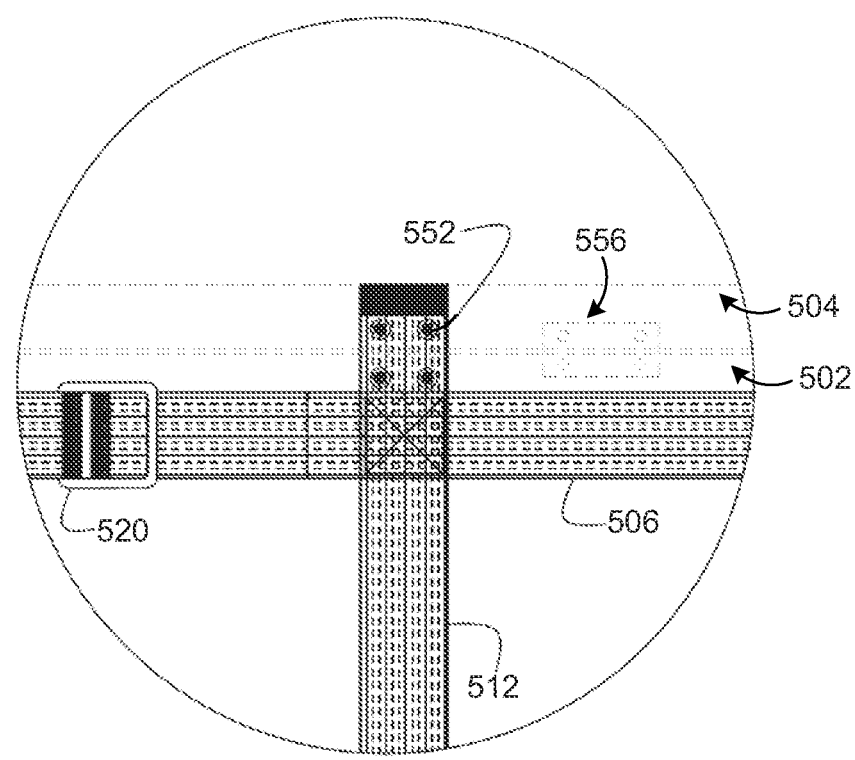

In this example, each strap 510-512 includes multiple grommets 550-552, respectively. Each grommet 550-552 forms an opening through its respective strap 510-512. Each grommet 550-552 is configured to receive a screw 554 or other connecting mechanism. As shown in FIGS. 6 and 8, the grommets 552 can be positioned so that one or multiple screws 554 can be inserted into the lid 504 of the cooler and one or multiple screws 554 can be inserted into the body of the cooler. This secures the strap 512 to the cooler, possibly as a replacement for a broken hinge 556 of the cooler or for reinforcement of the hinge 556. A similar operation could be used to secure the strap 510 to the cooler using the grommets 550.

Each grommet 550-552 includes any suitable structure forming an opening through a strap. Note, however, that the grommets 550-552 could alternatively form openings in a structure connected to the straps 510-512, in which case the openings are through other structures that can be secured to the cooler and which thereby secure the straps 510-512 to the cooler.

Although FIGS. 1 through 8 illustrate examples of devices for securing, carrying, and optionally repairing a cooler, various changes may be made to these figures. For example, this disclosure is not limited to the exact construction and operation shown and described here. The devices 100 and 500 can vary in size and shape to adapt to different coolers, materials, shapes, forms, functions, manners of operation, assemblies, and uses. For instance, the devices 100 and 500 could be used with other types of containers, such as other types of containers having lids.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A device comprising:
   first straps configured to be secured around a container in a first direction;
   second straps configured to be secured around the container in a second direction;
   third straps configured to be placed partially around the container in a third direction;
   first handles coupled to the third straps, the first handles configured to be raised above the container during lifting of the container;
   second handles coupled to one of the first straps, the second handles configured to remain secured to the first straps during lifting of the container; and
   multiple grommets configured to receive multiple connectors for securing the second straps to a body of the container and to a lid of the container.

2. The device of claim 1, wherein:
   the multiple grommets are in the second straps; and
   the connectors comprise screws.

3. The device of claim 1, wherein:
   lengths of at least the first and second straps are adjustable; and
   the device is configured to be secured around different containers having different shapes or sizes.

4. The device of claim 1, wherein:
   the first straps are configured to be secured horizontally around the container;
   the second straps are configured to be secured extending around the container from a top, down a back, under a bottom, and up a front of the container; and
   the third straps are configured to be placed from one side under the bottom to another side of the container without wrapping over the top of the container.

5. The device of claim 4, wherein:
   the first handles are coupled to the third straps along the sides of the container; and
   the second handles are coupled to a lower one of the first straps along the sides of the container.

6. The device of claim 1, wherein the third straps comprise a single continuous strap that threads through each of the first handles.

7. The device claim 1, wherein the first and second handles are located on common sides of the container.

8. A system comprising:
   a container having a body and a lid; and
   a device comprising:
      first straps configured to be secured around the container in a first direction;
      second straps configured to be secured around the container in a second direction;
      third straps configured to be placed partially around the container in a third direction;
      first handles coupled to the third straps, the first handles configured to be raised above the container during lifting of the container;
      second handles coupled to one of the first straps, the second handles configured to remain secured to the first straps during lifting of the container; and
      multiple grommets configured to receive multiple connectors for securing the second straps to the body of the container and to the lid of the container.

9. The system of claim 8, wherein:
   the multiple grommets are in the second straps; and
   the connectors comprise screws.

10. The system of claim 8, wherein lengths of at least the first and second straps are adjustable.

11. The system of claim 8, wherein:
    the first straps are configured to be secured horizontally around the container;
    the second straps are configured to be secured extending around the container from a top, down a back, under a bottom, and up a front of the container; and
    the third straps are configured to be placed from one side under the bottom to another side of the container without wrapping over the top of the container.

12. The system of claim 11, wherein:
    the first handles are coupled to the third straps along the sides of the container; and
    the second handles are coupled to a lower one of the first straps along the sides of the container.

13. The system of claim 8, wherein the third straps comprise a single continuous strap that threads through each of the first handles.

14. The system of claim 8, wherein the container comprises a cooler.

15. The system of claim 8, wherein the first and second handles are located on common sides of the container.

16. A method comprising:
    placing a device around a container having a body and a lid; and
    transporting the container using the device;
    wherein the device comprises:
       first straps configured to be secured around the container in a first direction;
       second straps configured to be secured around the container in a second direction;
       third straps configured to be placed partially around the container in a third direction;
       first handles coupled to the third straps, the first handles configured to be raised above the container during lifting of the container; and
       second handles coupled to one of the first straps, the second handles configured to remain secured to the first straps during lifting of the container; and
    wherein the method further comprises receiving multiple connectors through multiple grommets of the device, the connectors securing the second straps to the body of the container and to the lid of the container.

17. The method of claim 16, wherein lengths of at least the first and second straps are adjustable.

18. The method of claim 16, wherein:
    the first straps are secured horizontally around the container;

the second straps are secured extending around the container from a top, down a back, under a bottom, and up a front of the container; and the third straps are placed from one side under the bottom to another side of the container without wrapping over the top of the container.

19. The method of claim 18, wherein:

the first handles are coupled to the third straps along the sides of the container; and the second handles are coupled to a lower one of the first straps along the sides of the container.

20. The method of claim 16, wherein the first and second handles are located on common sides of the container.

* * * * *